US012560156B2

(12) United States Patent
Barnett et al.

(10) Patent No.: US 12,560,156 B2
(45) Date of Patent: Feb. 24, 2026

(54) PACKING SEAL ASSEMBLY

(71) Applicant: Kerr Machine Co., Sulphur, OK (US)

(72) Inventors: Christopher Todd Barnett, Stratford, OK (US); Micheal Cole Thomas, Azle, OK (US); Kelcy Jake Foster, Sulphur, OK (US); Nicholas Son, Davis, OK (US); John Keith, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 19/199,806

(22) Filed: May 6, 2025

(65) Prior Publication Data

US 2025/0264095 A1      Aug. 21, 2025

Related U.S. Application Data

(63) Continuation of application No. 18/605,254, filed on Mar. 14, 2024, now Pat. No. 12,305,628, which is a
(Continued)

(51) Int. Cl.
  *F04B 39/12*     (2006.01)
  *F04B 1/0538*    (2020.01)
  (Continued)

(52) U.S. Cl.
  CPC .......... *F04B 39/122* (2013.01); *F04B 1/0538* (2013.01); *F04B 19/22* (2013.01); *F04B 27/00* (2013.01); *F04B 39/121* (2013.01); *F04B 53/164* (2013.01); *F16J 15/26* (2013.01); *F04B 23/06* (2013.01); *F04B 39/14* (2013.01);

*F04B 53/02* (2013.01); *F04B 53/22* (2013.01); *F16J 15/3236* (2013.01); *F16J 15/56* (2013.01)

(58) Field of Classification Search
  CPC ...... F04B 39/121; F04B 1/0538; F04B 19/22; F04B 27/00; F04B 39/122; F04B 53/164; F04B 23/06; F04B 39/14; F04B 53/02; F04B 53/16; F04B 53/22
  See application file for complete search history.

(56) References Cited

U.S. PATENT DOCUMENTS 4,592,558 A * 6/1986 Hopkins .............. F16J 15/3212
                                                277/572
5,799,953 A * 9/1998 Henderson ........... F16J 15/3236
                                                277/567
(Continued)

OTHER PUBLICATIONS engineersedge.com; AISI Steel Mechanical Characteristics—Yield, Tensile, Elongation, Hardness, Izod. from engineersedge.com/materials/carbon-steel-properties.htm (Year: 2025).*
(Continued)

*Primary Examiner* — David N Brandt
(74) *Attorney, Agent, or Firm* — Tomlinson McKinstry, P.C.

(57)          ABSTRACT

A fluid end assembly comprising a plurality of fluid end sections positioned in a side-by-side relationship. Each fluid end section comprises a housing having a bore formed therein for housing a reciprocating plunger. Fluid is prevented from leaking around the plunger by a packing seal assembly. The packing seal assembly comprises one and only one packing seal.

20 Claims, 17 Drawing Sheets

Related U.S. Application Data continuation of application No. 17/884,757, filed on Aug. 10, 2022, now Pat. No. 11,946,465.

(60) Provisional application No. 63/312,541, filed on Feb. 22, 2022, provisional application No. 63/310,269, filed on Feb. 15, 2022, provisional application No. 63/304,070, filed on Jan. 28, 2022, provisional application No. 63/301,524, filed on Jan. 21, 2022, provisional application No. 63/246,099, filed on Sep. 20, 2021, provisional application No. 63/240,889, filed on Sep. 4, 2021, provisional application No. 63/235,251, filed on Aug. 20, 2021, provisional application No. 63/233,241, filed on Aug. 14, 2021.

(51) Int. Cl.

| | |
|---|---|
| *F04B 19/22* | (2006.01) |
| *F04B 23/06* | (2006.01) |
| *F04B 27/00* | (2006.01) |
| *F04B 39/14* | (2006.01) |
| *F04B 53/02* | (2006.01) |
| *F04B 53/16* | (2006.01) |
| *F04B 53/22* | (2006.01) |
| *F16J 15/26* | (2006.01) |
| *F16J 15/3236* | (2016.01) |
| *F16J 15/56* | (2006.01) |

(56) References Cited

U.S. PATENT DOCUMENTS

| | | | |
|---|---|---|---|
| 2008/0029264 A1* | 2/2008 | Williams | F16J 15/3236 |
| | | | 166/191 |
| 2013/0319220 A1* | 12/2013 | Luharuka | F04B 53/166 |
| | | | 92/165 R |

OTHER PUBLICATIONS material-properties.org; Tungsten Carbide _ Density, Strength, Hardness, Melting Point, from material-properties.org/tungsten-carbide-density-strength-hardness-melting-point/ (Year: 2025).*

\* cited by examiner

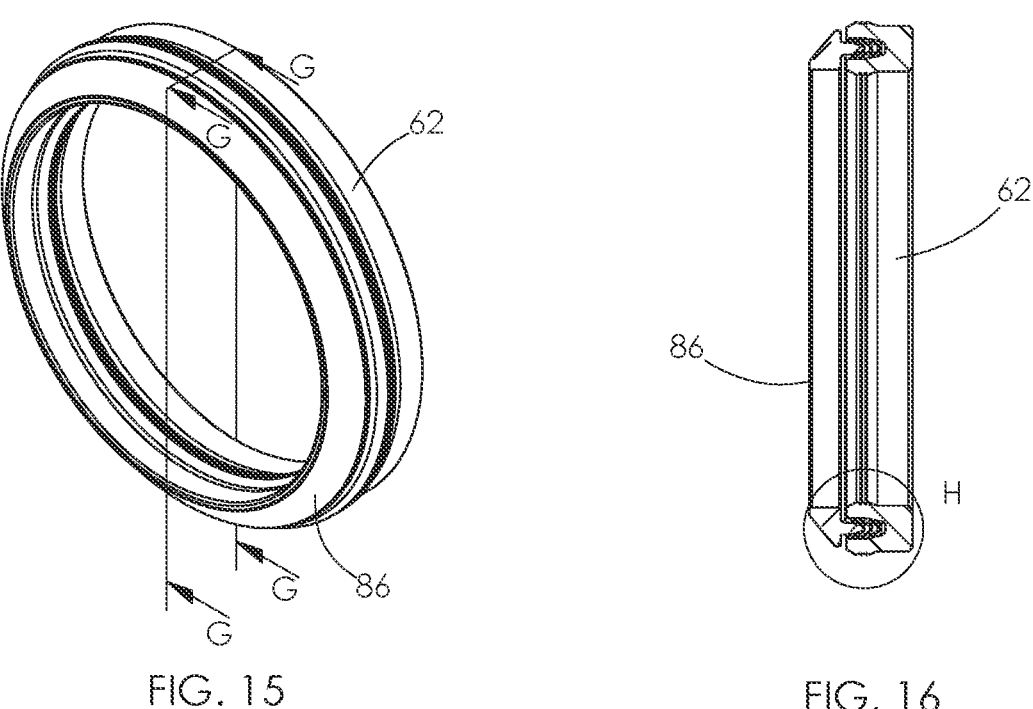
FIG. 15
FIG. 16
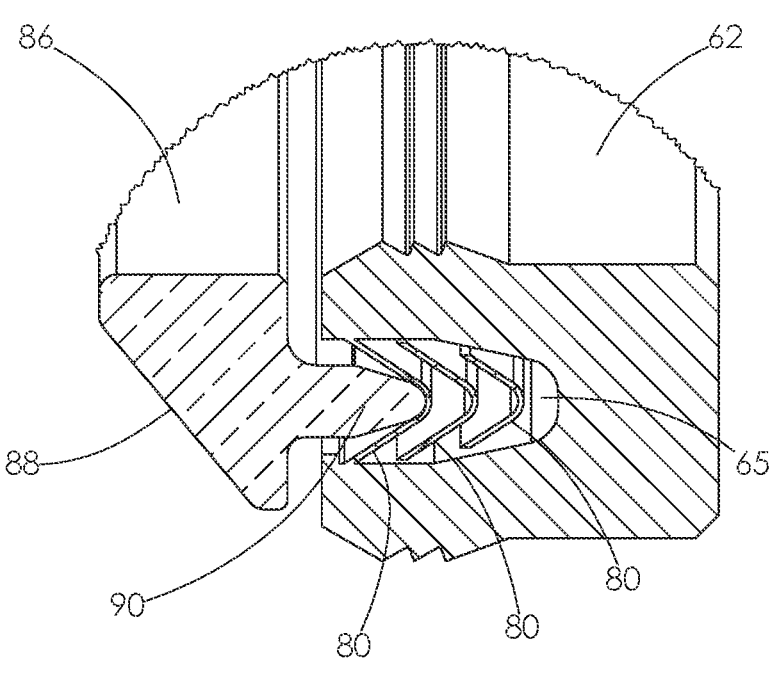
FIG. 17

PACKING SEAL ASSEMBLY

SUMMARY

The present invention is directed to a fluid end comprising a housing having a longitudinal axis and opposed front and rear surfaces joined by an outer intermediate surface, and a bore formed within the housing and interconnecting the front and rear surfaces. The bore extends along the longitudinal axis of the housing. The housing further comprises a retainer attached to the rear surface of the housing by a plurality of fasteners, a reciprocating plunger disposed within the bore and the retainer, and one and only one packing seal installed within the housing and engaged an outer surface of the plunger.

The present invention is also directed to an apparatus comprising a packing seal assembly. The packing seal assembly is configured to be installed within a housing having a horizontal bore formed therein. The packing seal assembly comprises one and only one packing seal configured to surround and engage an outer surface of a reciprocating plunger. The one and only one packing seal has opposed front and rear surfaces joined by inner and outer surfaces and comprising an energizing component. The energizing component is installed within the seal and is configured to expand the inner and outer intermediate surfaces during operation. The packing seal assembly further comprises a wear ring surrounding the one and only one packing seal, and an annular component installed within the housing and comprising a projecting portion, the projecting portion engaging the energizing component.

BRIEF DESCRIPTION OF THE DRAWINGS

FIG. 15 is a front perspective view of the support element shown in FIG. 10 engaged with the packing seal shown in FIG. 5.

FIG. 16 is a cross-sectional view of the support element and packing seal shown in FIG. 15, taken along line G-G.

FIG. 17 is an enlarged view of area H shown in FIG. 15.

DETAILED DESCRIPTION

High pressure reciprocating pumps typically comprise a power end assembly attached to a fluid end assembly. Fluid end assemblies are typically used in oil and gas operations to deliver highly pressurized corrosive and/or abrasive fluids to piping leading to the wellbore. Fluid end assemblies are attached to power ends typically run by engines. The power end comprises a crankshaft configured to reciprocate a plurality of plungers within the fluid end assembly to pump fluid throughout the fluid end.

Fluid may be pumped throughout the fluid end assembly at pressures that range from 5,000-15,000 pounds per square inch (psi). However, the pressure may reach up to 22,500 psi. Power ends typically have a power output of at least 2,250 horsepower during hydraulic fracturing operations. A single fluid end typically delivers a fluid volume of about 185-690 gallons per minute or 4-16 barrels per minute during a fracking operation. When a plurality of fluid ends are used together, the fluid ends collectively deliver about 4,200 gallons per minute or 100 barrels per minute to the wellbore. The present invention improves the performance and life of the various components included in the fluid end assembly.

Figure 1:
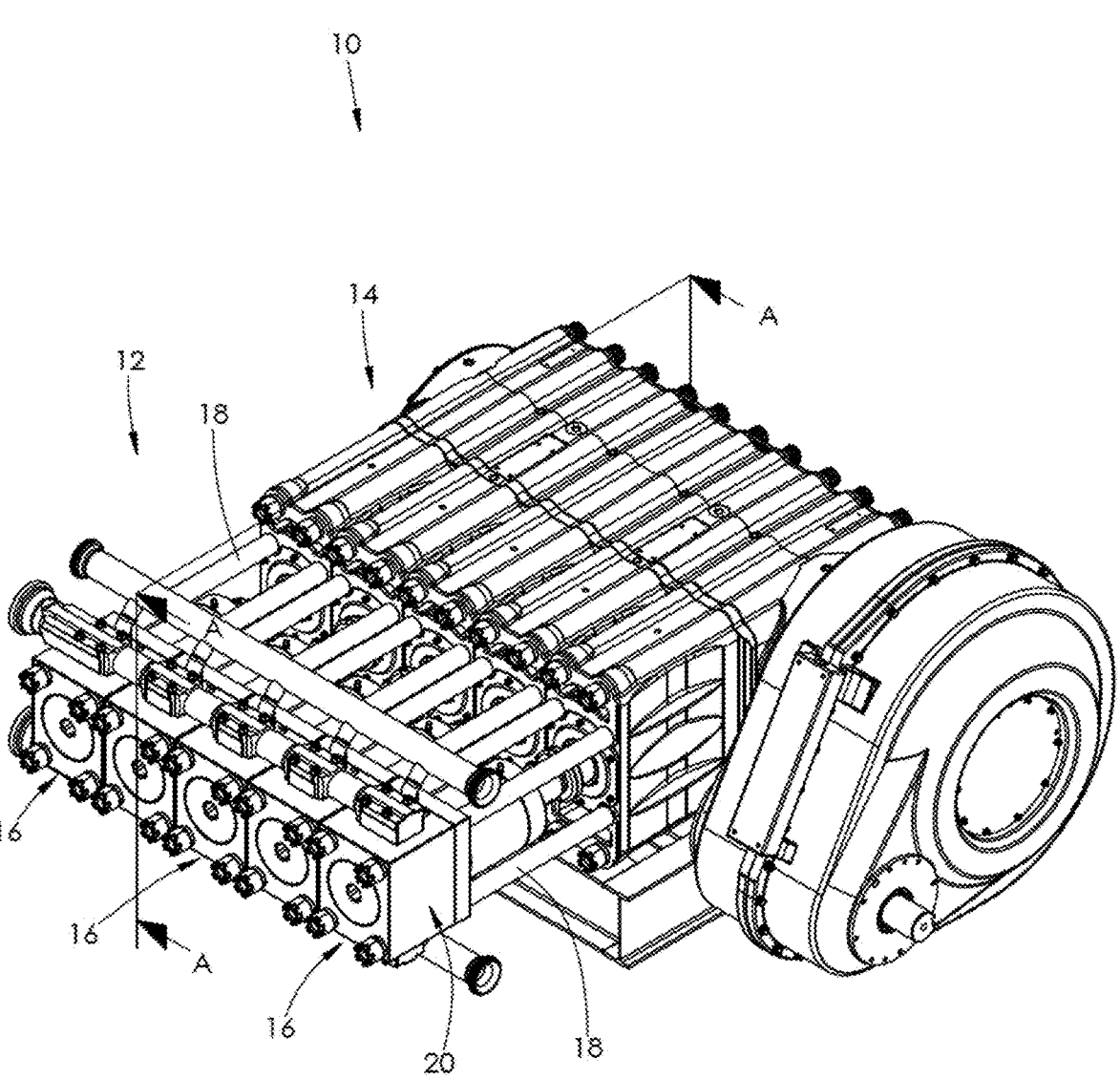
FIG. 1 is a perspective view of one embodiment of a high pressure pump.

Turning now to FIG. 1, one embodiment of a high pressure pump 10 is shown. The pump 10 comprises a fluid end assembly 12 joined to a power end assembly 14. The power end assembly 14 is described in more detail in U.S. patent application Ser. No. 17/884,691, authored by Keith, et al., and filed on Aug. 10, 2022, the entire contents of which are incorporated herein by reference. In alternative embodiments, the fluid end assembly 12 may be attached to other power end designs known in the art.

Continuing with FIG. 1, the fluid end assembly 12 comprises a plurality of individual fluid ends, or fluid end sections 16 positioned in a side-by-side relationship. Each fluid end section 16 is attached to the power end assembly 14 using a plurality of stay rods 18.

Figure 18:
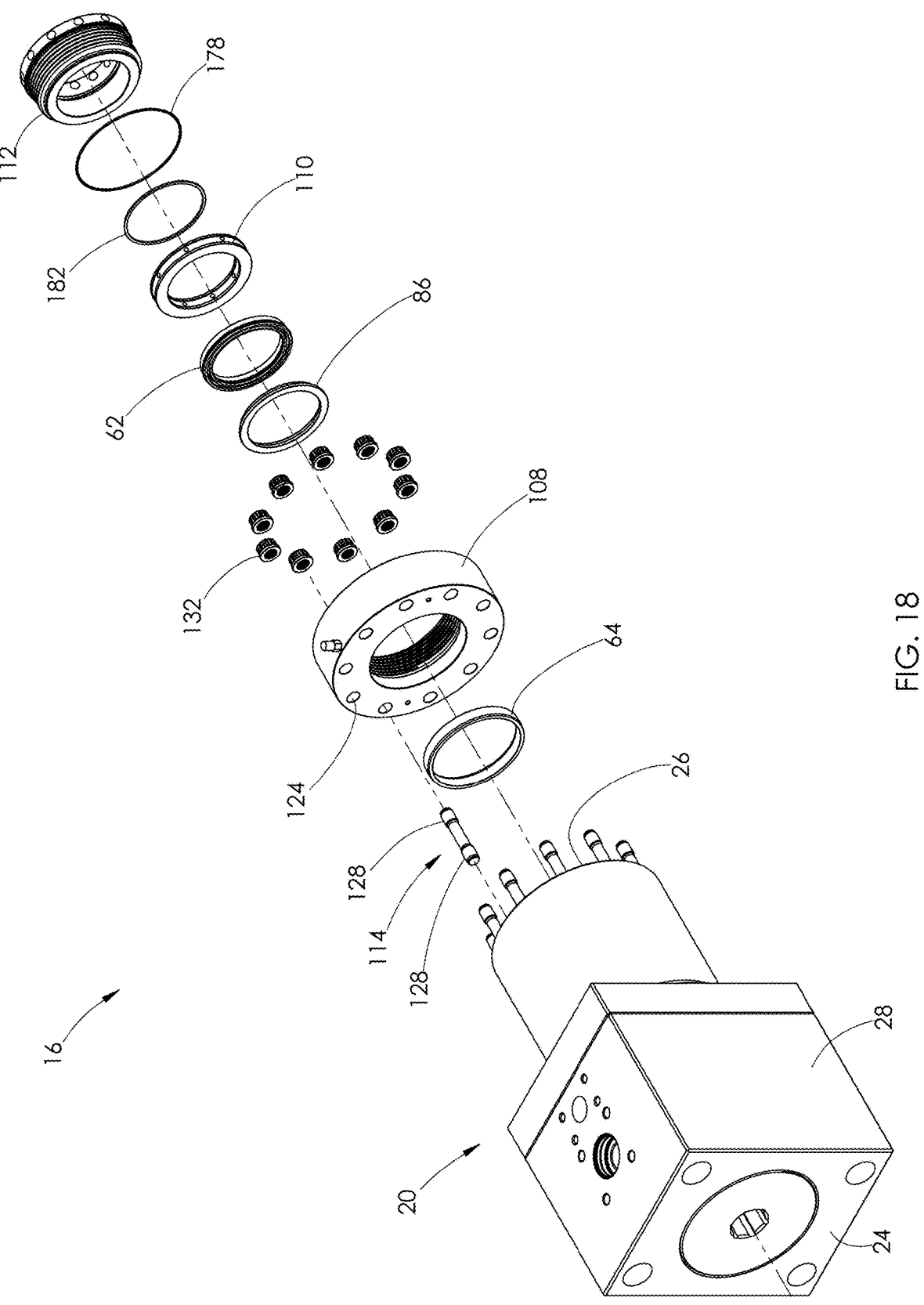
FIG. 18 is a front perspective and partially exploded view of one of the fluid end sections shown in FIG. 1.
Figure 19:
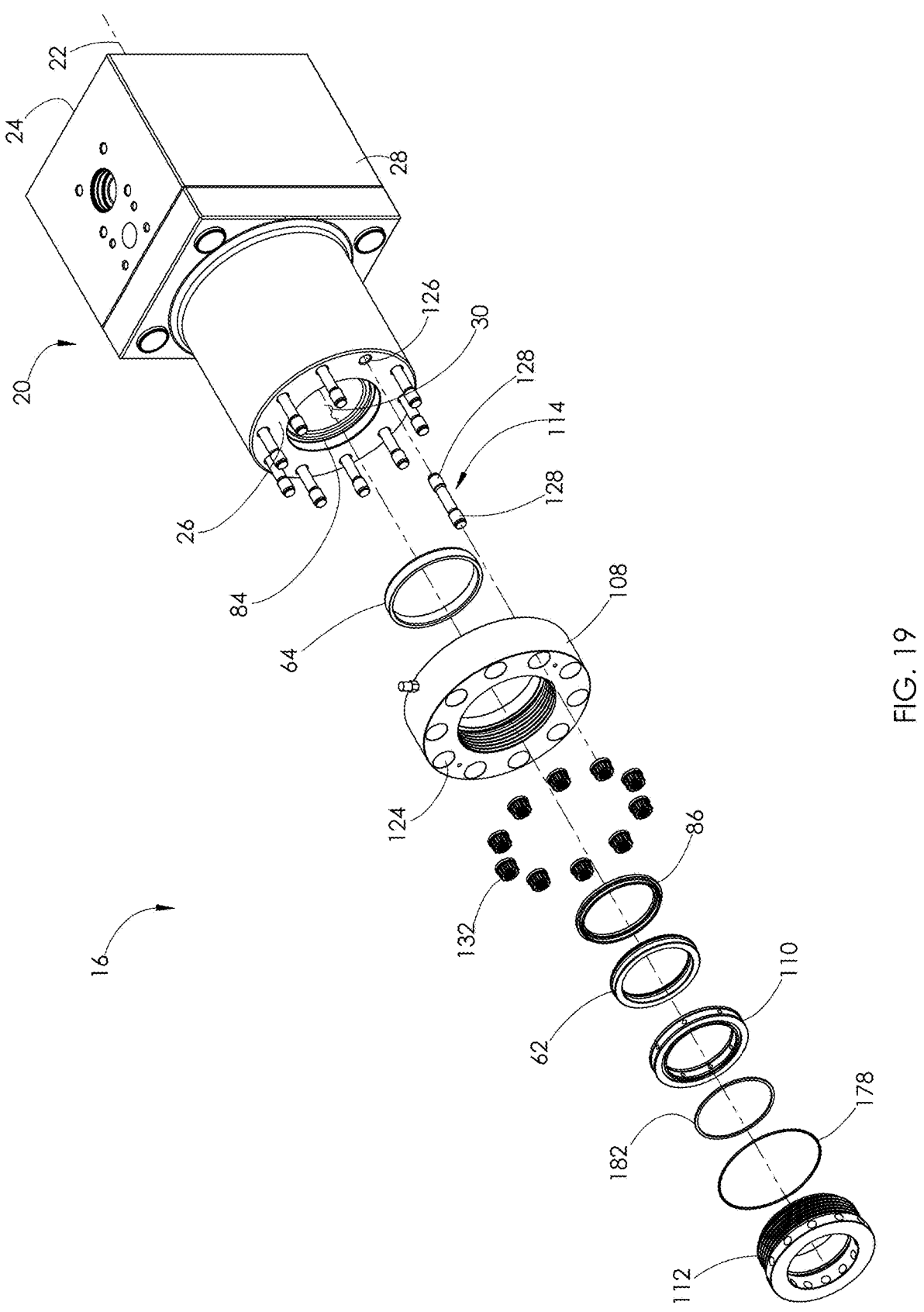
FIG. 19 is a rear perspective and partially exploded view of the fluid end section shown in FIG. 18.
Figure 20:
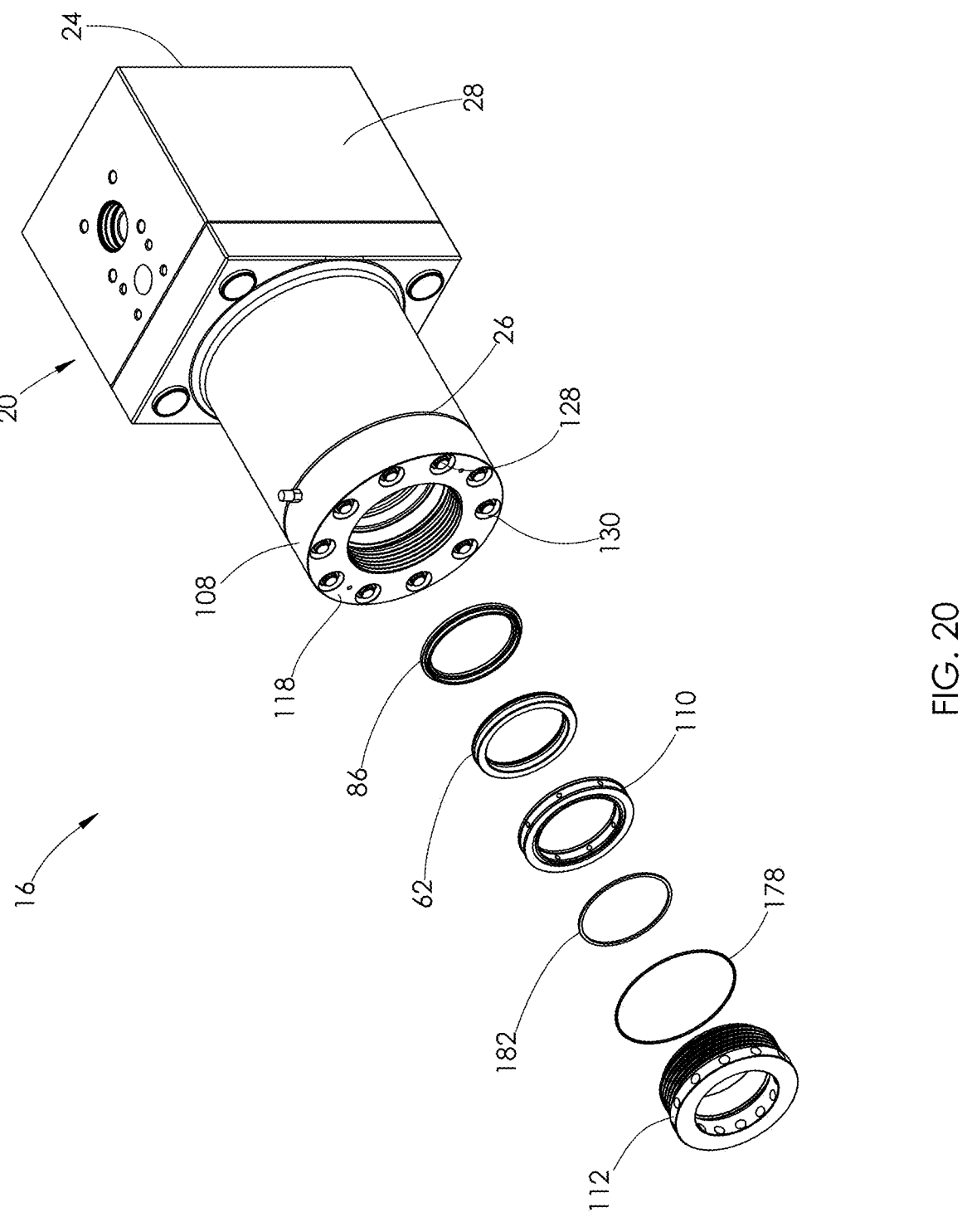
FIG. 20 is the rear perspective and partially exploded view of the fluid end section shown in FIG. 19, but fewer components are shown exploded.

Turning to FIGS. 18-20, each fluid end section 16 comprises a housing 20 having a longitudinal axis 22 and opposed front and rear surfaces 24 and 26 joined by an outer intermediate surface 28 and a horizontal bore 30 formed therein, as shown in FIG. 19. The horizontal bore 30 interconnects the front and rear surfaces 24 and 26 of the housing 20. The housing 20 comprises multiple pieces joined together by the stay rods 18, as shown in FIG. 1.

Figure 2:
FIG. 2 is a cross-sectional view of the fluid end assembly shown in FIG. 1, taken along line A-A, but a different embodiment of a fluid end housing is shown.
Figure 2:
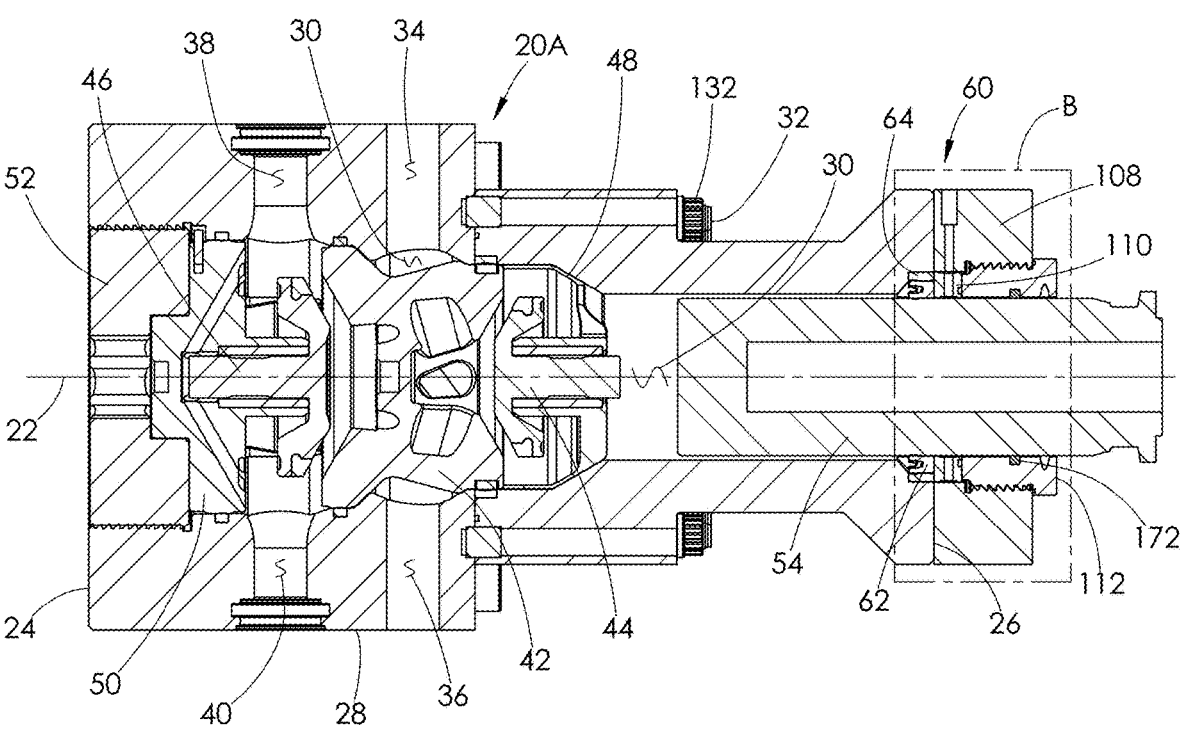
Figure 3:
FIG. 3 is the cross-sectional view of the fluid end assembly shown in FIG. 2, but the plunger has been removed.
Figure 3:
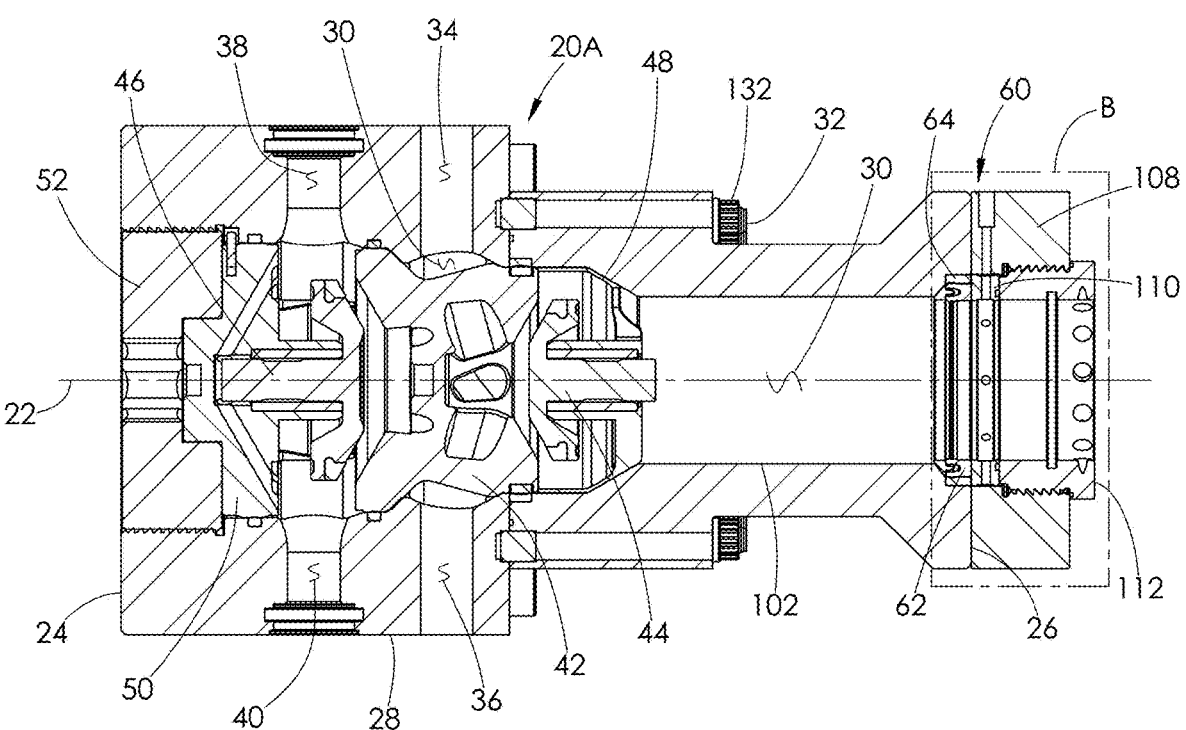
Figure 3A:
FIG. 3A is the cross-sectional view of the fluid end assembly shown in FIG. 3, but the cross-section is taken along a different axis.
Figure 3A:
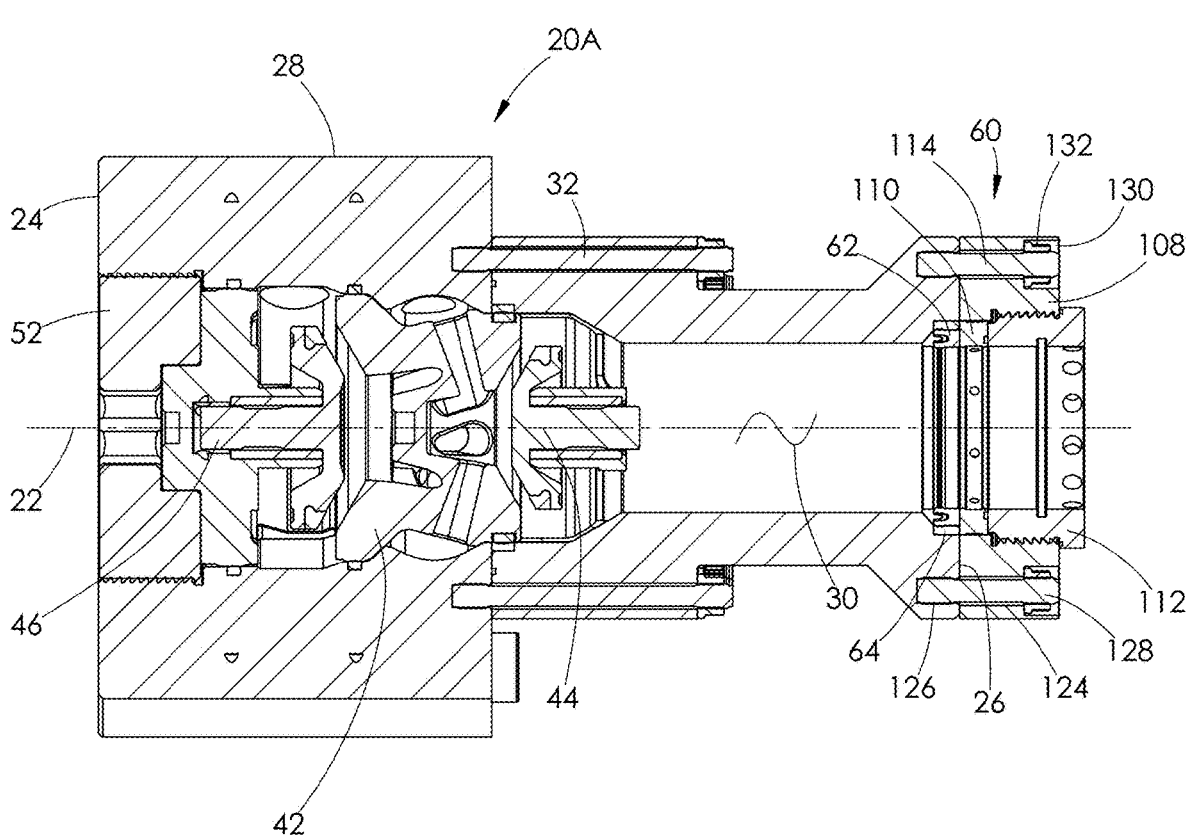

Turning to FIGS. 2-3A, another embodiment of a housing 20A is shown. Like the housing 20, the housing 20A comprises a longitudinal axis 22 and opposed front and rear surfaces 24 and 26 joined by an outer intermediate surface 28 and a horizontal bore 30 formed therein. In contrast to the housing 20, the housing 20A comprises multiple sections joined together by fasteners 32. In alternative embodiments, the housing 20 or 20A may be of single-piece construction.

Continuing with FIGS. 2-3A, fluid enters the housing 20A through upper and lower suction bores 34 and 36. Fluid exits the housing 20A through upper and lower discharge bores 38 and 40. Fluid is routed throughout the housing 20A by a fluid routing plug 42 and suction and discharge valves 44 and 46. Movement of the valves 44 and 46 is guided by a suction valve guide 48 and a discharge plug 50. The front surface 24 of the housing 20A is sealed by a front retainer 52.

Continuing with FIG. 2, a reciprocating plunger 54 is installed within the horizontal bore 30 and projects from the rear surface 26 of the housing 20A. As the plunger 54 retracts from the housing 20A, fluid is pulled from the suction bores 34 and 36 into the horizontal bore 30. As the plunger 54 extends into the housing 20A, the plunger 54 forces fluid towards the discharge bores 38 and 40. While not specifically shown herein, the housing 20, shown in FIGS. 1 and 18-20, uses the same inner components as the housing 20A and operates in the same manner as the housing 20A. The construction of the housing 20 and 20A and their above mentioned inner components are described in more detail in U.S. patent application Ser. No. 17/844,712, authored by Thomas et al., and filed on Aug. 10, 2022, the entire contents of which are incorporated herein by reference.

In traditional fluid ends, fluid is prevented from leaking from the rear surface of the housing by a plunger packing installed within the housing and surrounding the plunger. The plunger packing comprises a plurality of packing seals stacked on top of one another. A tight seal is created by compressing the plurality of stacked seals together longitudinally. During operation, the packing seals require continuous maintenance to make sure they are adequately compressed and sealing against the plunger. Over time, the components of the plunger packing wear against the walls of the housing, causing erosion and eventual failure of the housing.

Continuing with FIGS. 2-4, and 18-20, the present application discloses a packing seal assembly 60 that comprises one and only one packing seal 62. By using one and only packing seal 62, a much smaller surface area of the housing 20A or 20 is subject to potential wear from the seal 62. Further, the single packing seal 62 is much easier to install than a plurality of packing seals used with a traditional plunger packing. As will be described in more detail herein, only one packing seal 62 is needed because the packing seal 62 comprises an energizing component 66. The energizing component 66 expands the packing seal 62 during operation, ensuring a tight seal against an outer surface of the plunger 54.

Turning to FIGS. 5-9, traditional packing seals are solid and comprise only an elastomeric body. The packing seal 62 comprises the energizing component 66 installed within an elastomeric body 63. The body 63 is annular and has opposed front and rear surfaces 68 and 70 joined by inner and outer intermediate surfaces 72 and 74. The energizing component 66 is installed within an opening, or void, 65 formed in the front surface 68 of the packing seal 62 and is configured to expand radially when compressed longitudinally. Such expansion causes the inner intermediate surface 72 of the packing seal 62 to tightly seal against the outer surface of the plunger 54, and the outer intermediate surface 74 to tightly seal against the walls of the housing 20A or 20 or another component installed therein, as shown for example in FIG. 2.

Continuing with FIGS. 2-4, 18, and 19, one example of another component installed within the housing 20A or 20 is a wear ring 64. The wear ring 64 is shown installed within the housing 20A and surrounding the packing seal 62 in FIGS. 2-4. The wear ring 64 is positioned between the walls of the housing 20A or 20 and the packing seal 62 and is configured to protect the walls of the housing 20A or 20 from wear from the packing seal 62 during operation. The wear ring 64 is annular and is made of a harder and more wear resistant material than the housing 20A or 20. For example, if the housing 20A or 20 is made of steel, the wear ring 64 may be made of tungsten carbide. Another example of another component installed within the housing 20A or 20 may be a stuffing box or sleeve known in the art. The stuffing box or sleeve may be installed within the housing 20A or 20 and the packing seal 62 installed within the stuffing box or sleeve.

Figure 9:
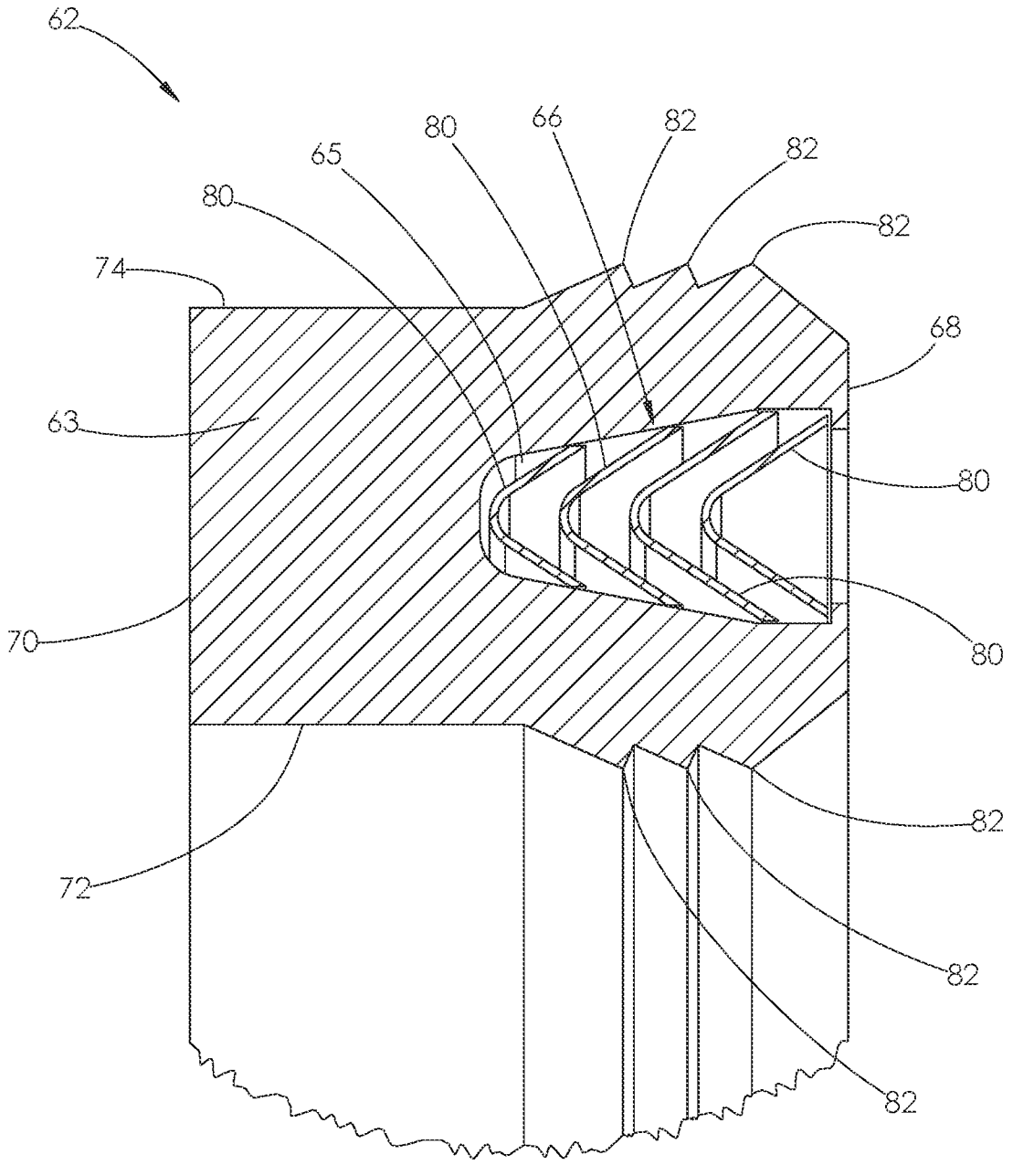
FIG. 9 is an enlarged view of area D shown in FIG. 8.
Figures 10, 11, 12, 13:
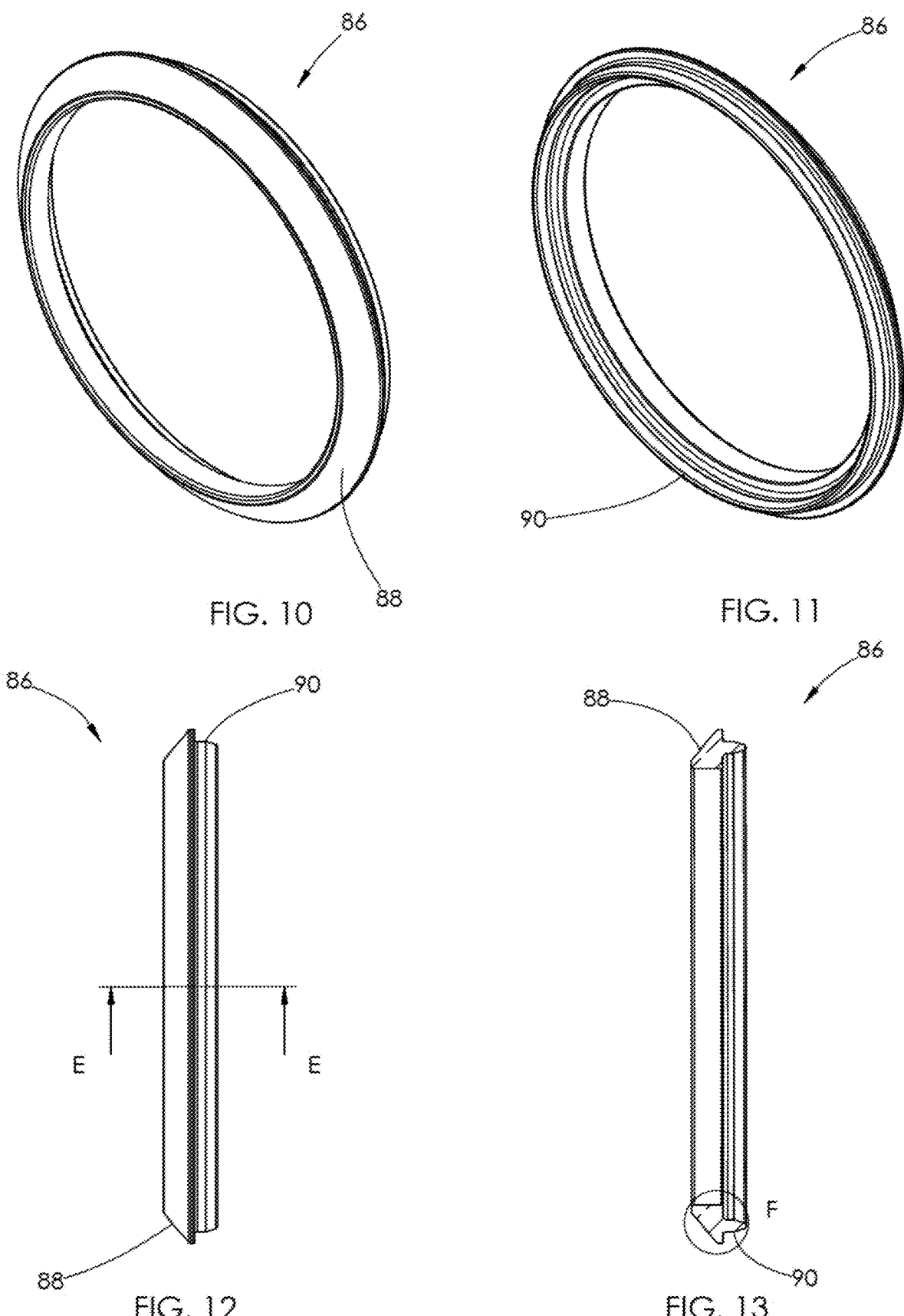
FIG. 10 is a front perspective view of the support element shown in FIGS. 2-4 and 18-20.
FIG. 11 is a rear perspective view of the support element shown in FIG. 10.
FIG. 12 is a side elevational view of the support element shown in FIG. 10.
FIG. 13 is a cross-sectional view of the support element shown in FIG. 12, taken along line E-E.

Continuing with FIG. 9, the energizing component 66 comprises a plurality of stacked metal pieces 80 having a V-shaped cross-section that function as a spring. Specifically, the packing seal 62 is known in the art as a multi-contact V-nested spring seal. In alternative embodiments, the energizing component may comprise other components known in the art that expand radially when compressed longitudinally. In further alternative embodiments, the energizing component may comprise one or more coiled springs configured to expand the seal regardless of any longitudinal compression.

Continuing with FIG. 9, the inner and outer surfaces 72 and 74 of the packing seal 62 comprise a plurality of seal lips 82. The seal lips 82 help effectuate sealing during operation. As the seal lips 82 wear over time, the energizing component 66 expands, pushing the lips 82 tighter against the plunger 54 and the wear ring 64.

Figure 14:
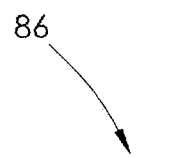
FIG. 14 is an enlarged view of area F shown in FIG. 13.
Figure 14:
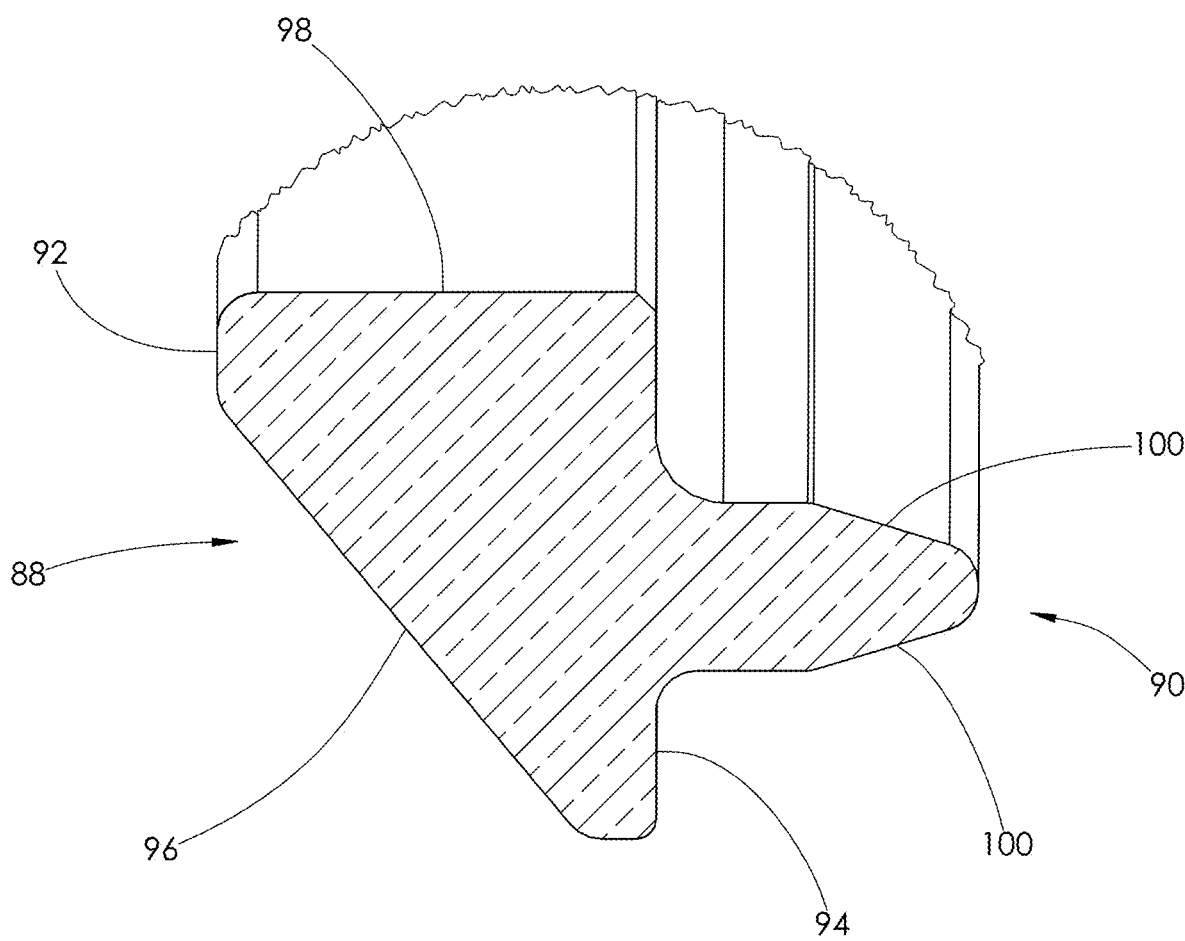

With reference to FIGS. 10-17, the packing seal assembly 60 further comprises a support element 86. The support element 86 comprises an annular base 88 joined to an annular protrusion 90. The base 88 comprises opposed front and rear surfaces 92 and 94 joined by a tapered outer surface 96 and a cylindrical inner surface 98. The protrusion 90 projects from the rear surface 94 and has a tapered outer surface 100, as shown in FIG. 14. The rear surface 94 of the support element 86 is configured to engage the front surface 68 of the packing seal 62 such that the protrusion 90 projects into the energizing component 66, as shown in FIG. 17. In operation, the protrusion 90 helps keep the energizing component 66 expanded so as to maintain a tight seal against the plunger 54. However, the packing seal assembly 60 may be used without the support element 86, if desired.

Figure 4:
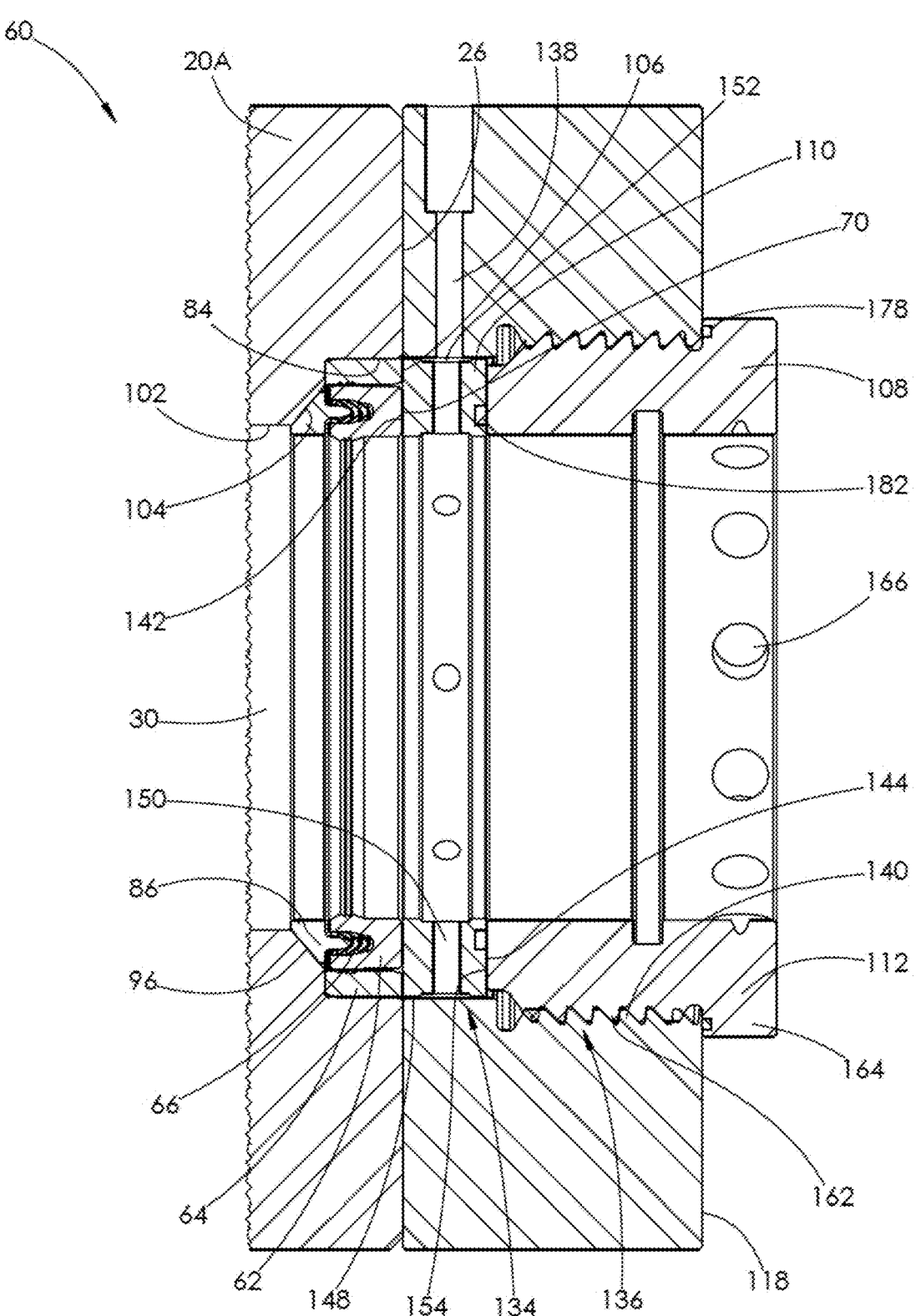
FIG. 4 is an enlarged view of area B shown in FIG. 3.
Figures 5, 6:
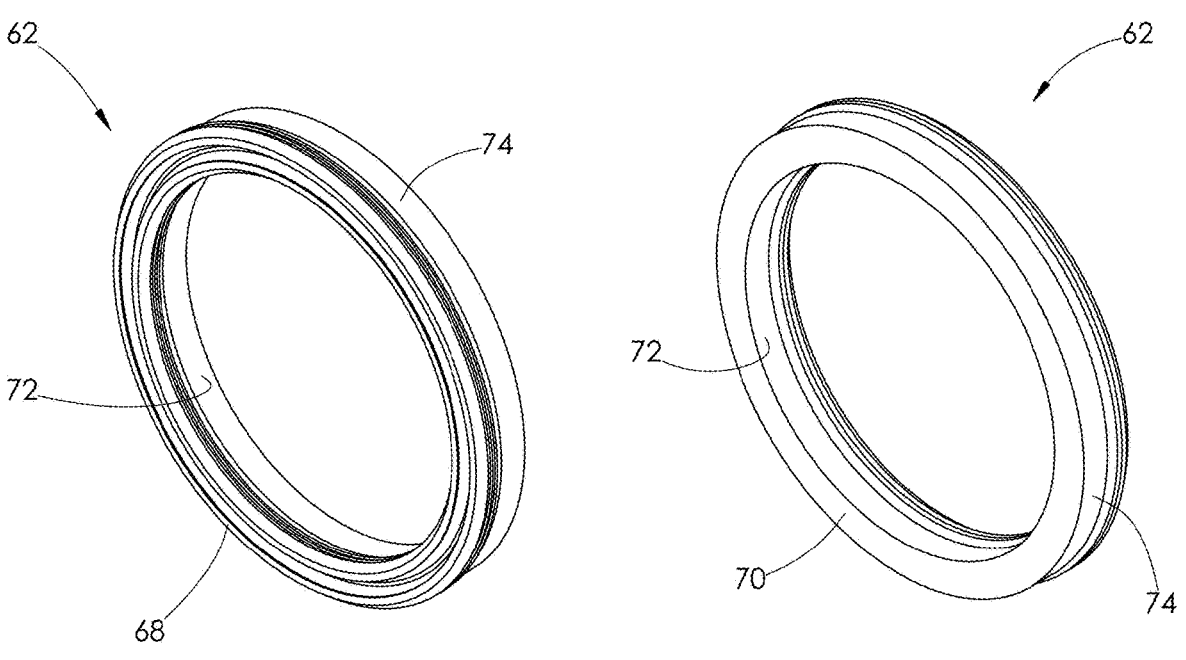
FIG. 5 is a front perspective view of the packing seal shown in FIGS. 2-4 and 18-20.
FIG. 6 is a rear perspective view of the packing seal shown in FIG. 5.
Figure 7:
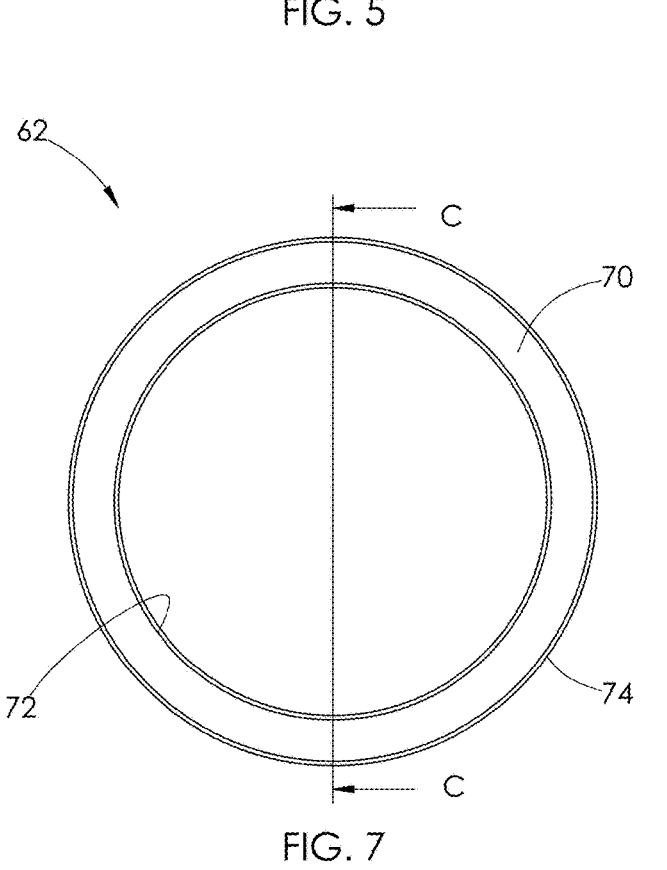
FIG. 7 is a rear elevational view of the packing seal shown in FIG. 5.
Figure 8:
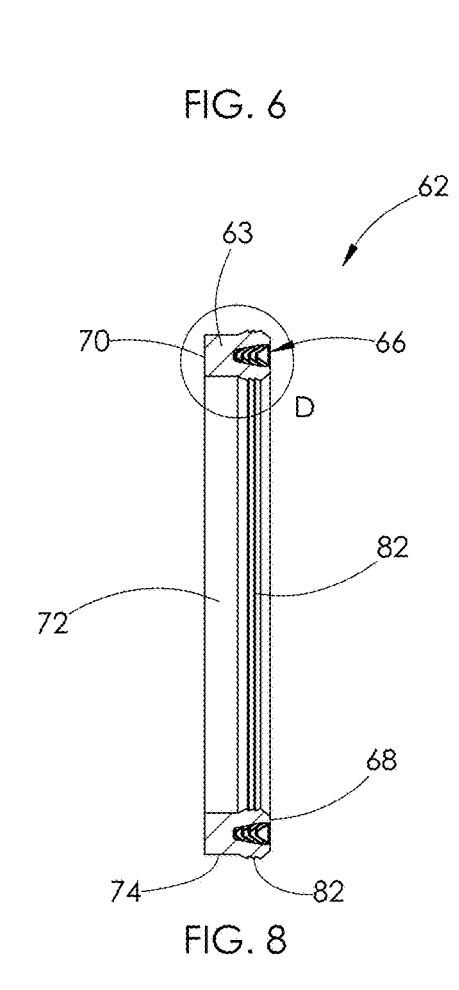
FIG. 8 is a cross-sectional view of the packing seal shown in FIG. 7, taken along line C-C.

Turning back to FIGS. 3 and 4, the horizontal bore 30 comprises a counterbore 84 that opens on the rear surface 26 of the housing 20A. The counterbore 84 joins a uniform diameter section 102 of the horizontal bore 30 by a tapered surface 104, as shown in FIG. 4. The support element 86 is installed within the housing 20A such that the tapered outer surface 96 engages the tapered surface 104 of the housing 20A. The packing seal 62 and the wear ring 64 are installed within the counterbore 84 such that the wear ring 64 engages the walls of the counterbore 84 and the packing seal 62 engages the support element 86. When the components are installed within the housing 20A, the rear surface 70 of the packing seal 62 and a rear surface 106 of the wear ring 64 are flush with the rear surface 26 of the housing 20A. The housing 20 also comprises the counterbore 84 for receiving the support element 86, the wear ring 64 and the packing seal 62, as shown in FIG. 19.

With reference to FIGS. 2-4, 18, and 19, the packing seal 62 and wear ring 64 are held within the housing 20 or 20A by a rear retainer 108 having a metal ring 110 and a packing nut 112 installed therein. The rear retainer 108 is attached to the rear surface 26 of the housing 20 or 20A using a plurality of fasteners 114, as shown in FIGS. 3A, 18 and 19.

With reference to FIGS. 21-24, the rear retainer 108 comprises opposed front and rear surfaces 116 and 118 joined by an outer intermediate surface 120 and a central passage 122 formed therein. A plurality of passages 124 are formed in the rear retainer 108. Each passage 124 interconnects the front and rear surfaces 116 and 118. The retainer 108 is positioned on the rear surface 26 of the housing 20 or 20A such that the passages 124 align with a plurality of threaded openings 126 formed in the rear surface 26 of the housing 20 and 20A, as shown in FIGS. 3A and 19.

Figures 21, 22, 23, 24:
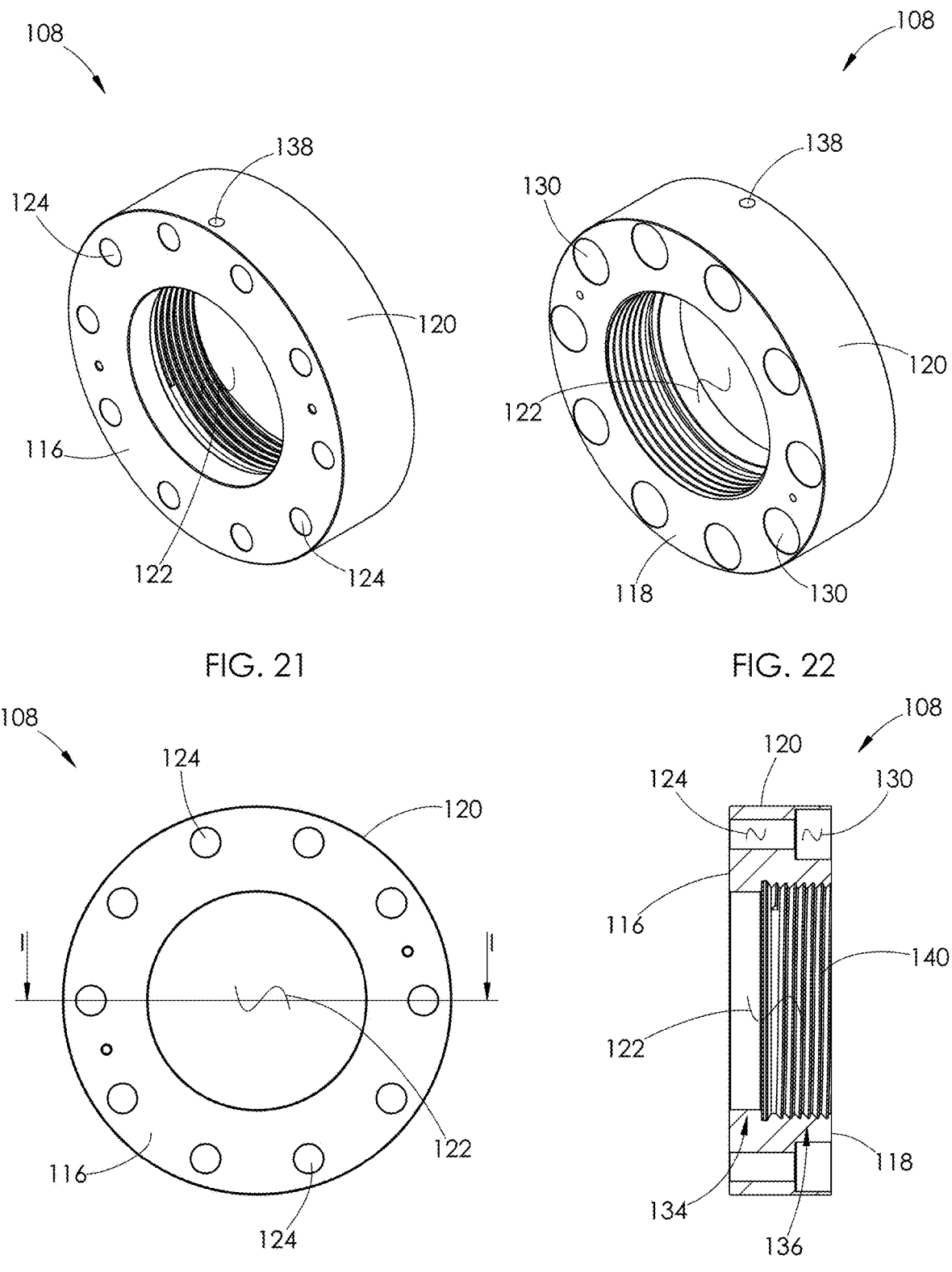
FIG. 21 is a front perspective view of the rear retainer shown in FIGS. 2-4 and 18-20.
FIG. 22 is a rear perspective view of the rear retainer shown in FIG. 21.
FIG. 23 is a front elevational view of the rear retainer shown in FIG. 21.
FIG. 24 is a cross-sectional view of the rear retainer shown in FIG. 23, taken along line I-I.

With reference to FIGS. 3A and 18-20, a fastener 114 is received within each pair of aligned openings and passages 126 and 124. When installed therein, a threaded end 128 of each fastener 114 is positioned within a counterbore 130 formed in each passage 124 adjacent the rear surface 118 of the retainer 108, as shown in FIGS. 3A, 20 and 24. A threaded nut 132 is installed on each threaded end 128 and turned until the retainer 108 is held firmly against the rear surface 26 of the housing 20 or 20A. The nuts 132 are each fully disposed within each counterbore 130, such that no nut projects from the rear surface 118 of the retainer 108, as shown in FIGS. 3A and 20. In alternative embodiments, the passages 122 may not include the counterbore 130 and the nuts 132 may instead engage the rear surface 118 of the retainer 108.

Turning back to FIG. 24, the central passage 122 of the rear retainer 108 comprises a first section 134 joined to a second section 136. The first section 134 opens on the front surface 116 of the rear retainer 108, and the second section 136 opens on the rear surface 118 of the rear retainer 108. One or more lube ports 138 are also formed in the retainer 108. The lube port 138 interconnects the outer intermediate surface 120 and the first section 134 of the central passage 122, as shown in FIG. 4.

Continuing with FIGS. 4 and 24, internal threads 140 are formed in the walls of the second section 136 for receiving the packing nut 112. The walls surrounding the first section 134 of the central passage 122 are flat and configured to receive the metal ring 110. When the retainer 108 is attached to the housing 20, the central passage 122 aligns with the counterbore 84 formed in the housing 20A or 20, exposing the wear ring 64 and packing seal 62, as shown in FIG. 4.

With reference to FIGS. 25-28, the metal ring 110 comprises opposed front and rear surfaces 142 and 144 joined by inner and outer surfaces 146 and 148. A plurality of passages 150 are formed in the metal ring 110 that interconnect the inner and outer surfaces 146 and 148. The passages 150 open into an annular channel 152 formed in the outer surface 148 of the metal ring 110.

Continuing with FIG. 4, when the metal ring 110 is installed within the central passage 122, the front surface 142 of the metal ring 110 engages the rear surface 70 of the packing seal 62 and the rear surface 106 of the wear ring 64, and the outer surface 148 engages the first section 134 of the central passage 122. The lube port 138 formed in the retainer 108 aligns with the annular channel 152. During operation, lubricant is supplied to the fluid end section 16 through the lube port 138. Lubricant passes through the lube port 138 and into the annular channel 152 and eventually through the passages 150. Lubricant flowing through the passages 150 contacts and lubricates an outer surface of the reciprocating plunger 54.

With reference to FIGS. 2-4, 18-20, and 29-32, the metal ring 110 is held within the retainer 108 by the packing nut 112. The packing nut 112 comprises opposed front and rear surfaces 154 and 156 joined by an outer intermediate surface 158 and a central passage 160 formed therein. The intermediate surface 158 comprises a threaded section 162 joined to a flange 164. The threaded section 162 is configured to mate with the internal threads 140 formed in the second section 136 of the central passage 122 of the rear retainer 108, as shown in FIG. 4.

Figures 29, 30, 31, 32:
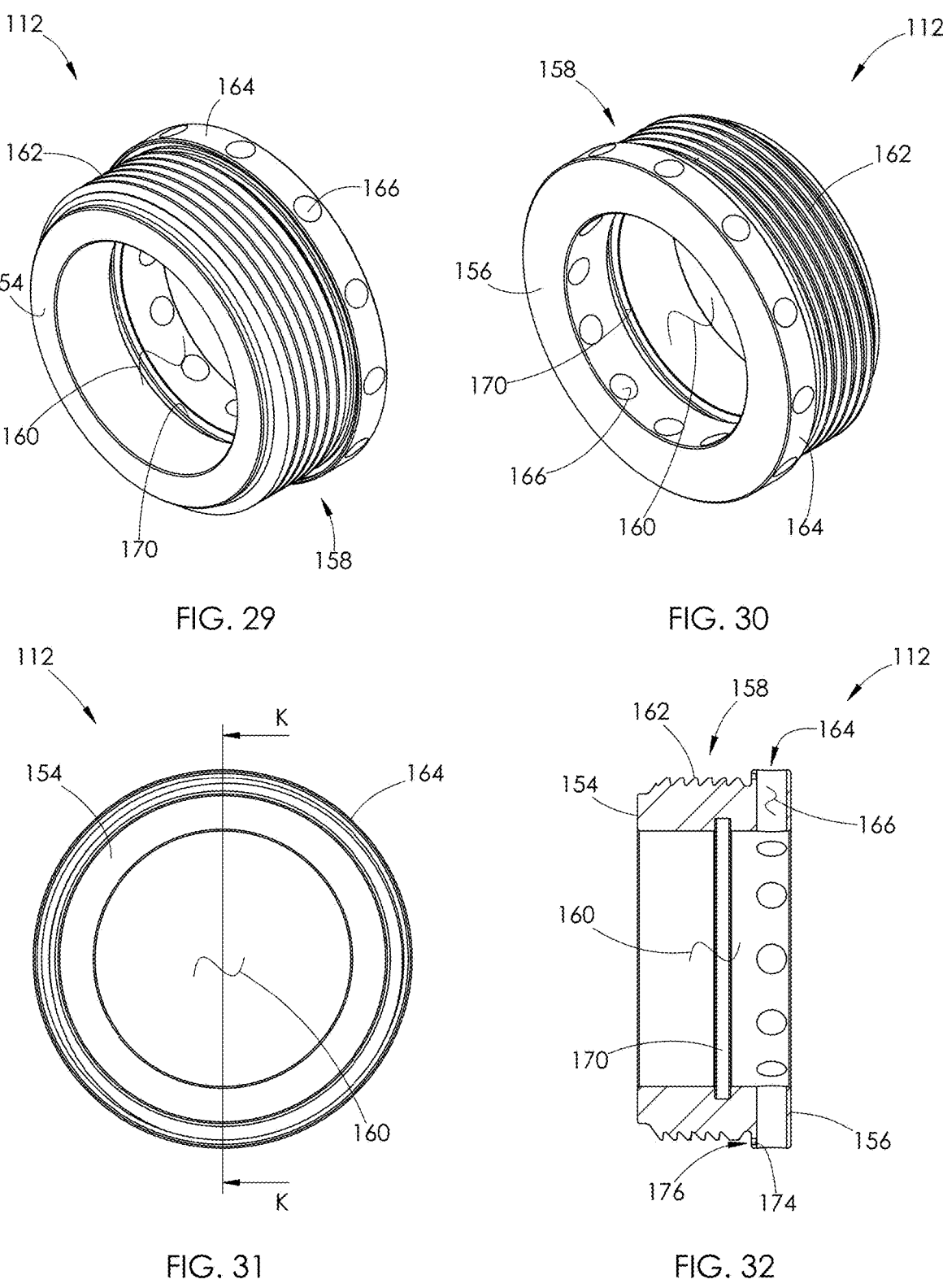
FIG. 29 is a front perspective view of the packing nut shown in FIGS. 2-4 and 18-20.
FIG. 30 is a rear perspective view of the packing nut shown in FIG. 29.
FIG. 31 is a front elevational view of the packing nut shown in FIG. 29.
FIG. 32 is a cross-sectional view of the packing nut shown in FIG. 31, taken along line 32.

Continuing with FIGS. 4 and 32, a plurality of openings 166 are formed in the flange 164 of the packing nut 112. Each opening 166 interconnects the outer intermediate surface 158 and the central passage 160. The openings 166 are configured to receive a tool used to turn the packing nut 112 within the retainer 108. The packing nut 112 is turned within the central passage 122 until the front surface 154 of the packing nut 112 tightly engages the rear surface 144 of the metal ring 110 and the flange 164 abuts the rear surface 118 of the retainer 108, as shown in FIG. 4. When tightly engaged, the front surface 142 of the metal ring 110 likewise tightly engages the rear surface 70 of the packing seal 62 and the rear surface 106 of the wear ring 64, thereby retaining the packing seal 62 and wear ring 64 within the housing 20 or 20A.

Continuing with FIGS. 2, 4, and 32, a first groove 170 is formed within the walls of the central passage 160 of the packing nut 112 for housing a first seal 172, as shown in FIG. 2. The first seal 172 engages an outer surface of the plunger 54 and prevents fluid from leaking between the components, as shown in FIG. 2. A second groove 174 is formed in a front surface 176 of the flange 164 of the packing nut 112 for housing a second seal 178, as shown in FIG. 4. When the flange 164 abuts the rear surface 118 of the retainer 108, the second seal 178 engages the rear surface 118 of the retainer 108. The second seal 178 provides friction between the retainer 108 and the packing nut 112 to help prevent the packing nut 112 from backing out of the retainer 108 during operation.

Figures 25, 26, 27, 28:
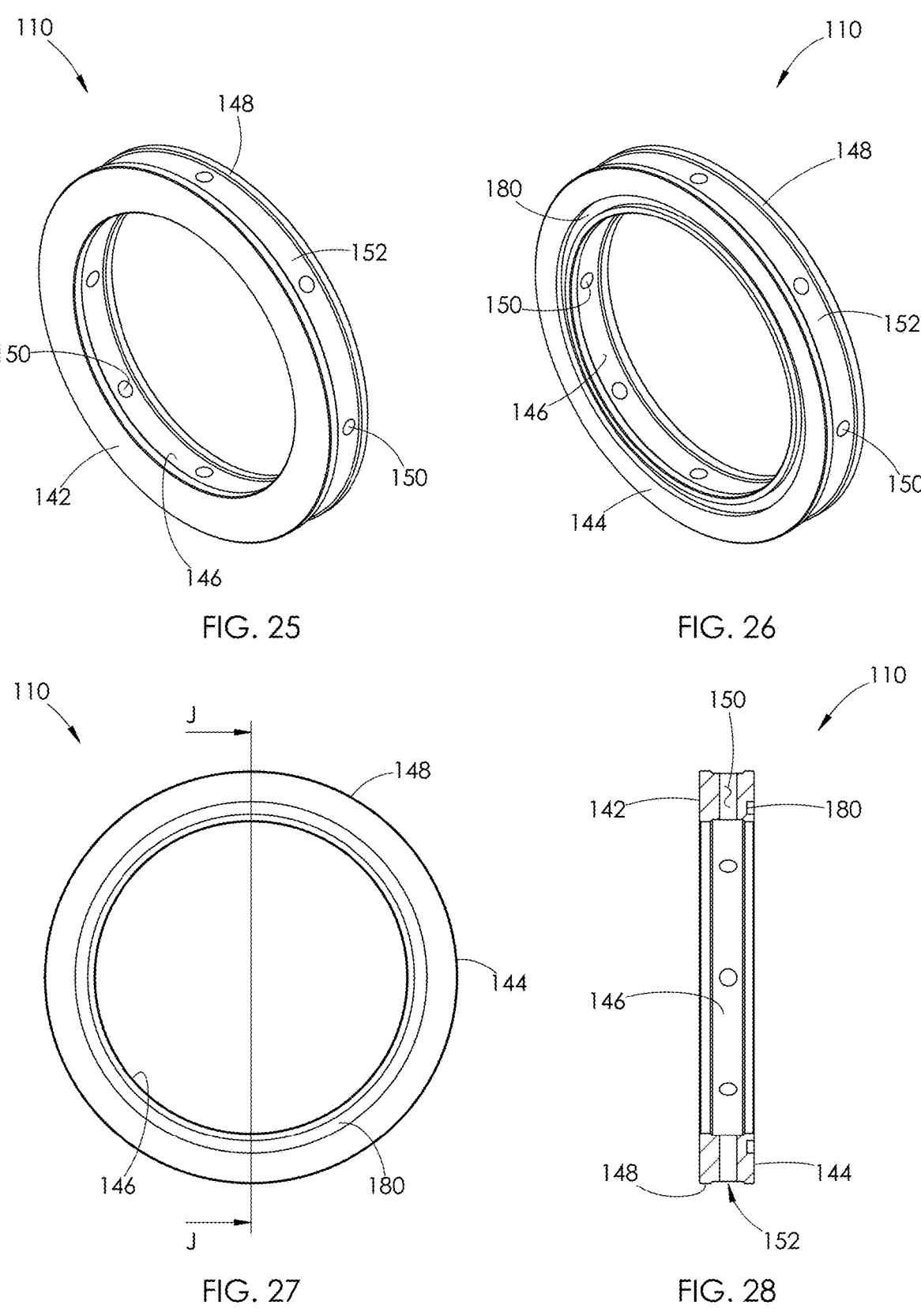
FIG. 25 is a front perspective view of the metal ring shown in FIGS. 2-4 and 18-20.
FIG. 26 is a rear perspective view of the metal ring shown in FIG. 25.
FIG. 27 is a rear elevational view of the metal ring shown in FIG. 25.
FIG. 28 is a cross-sectional view of the metal ring shown in FIG. 27, taken along line J-J.

Similarly, a groove 180 is formed in the rear surface 144 of the metal ring 110 for housing a seal 182, as shown in FIGS. 4 and 28. The seal 182 prevents fluid from leaking between the metal ring 110 and packing nut 112 during operation. The seal 182 further provides friction between the metal ring 110 and the packing nut 112 to help prevent the packing nut 112 from backing off during operation.

Figure 33:
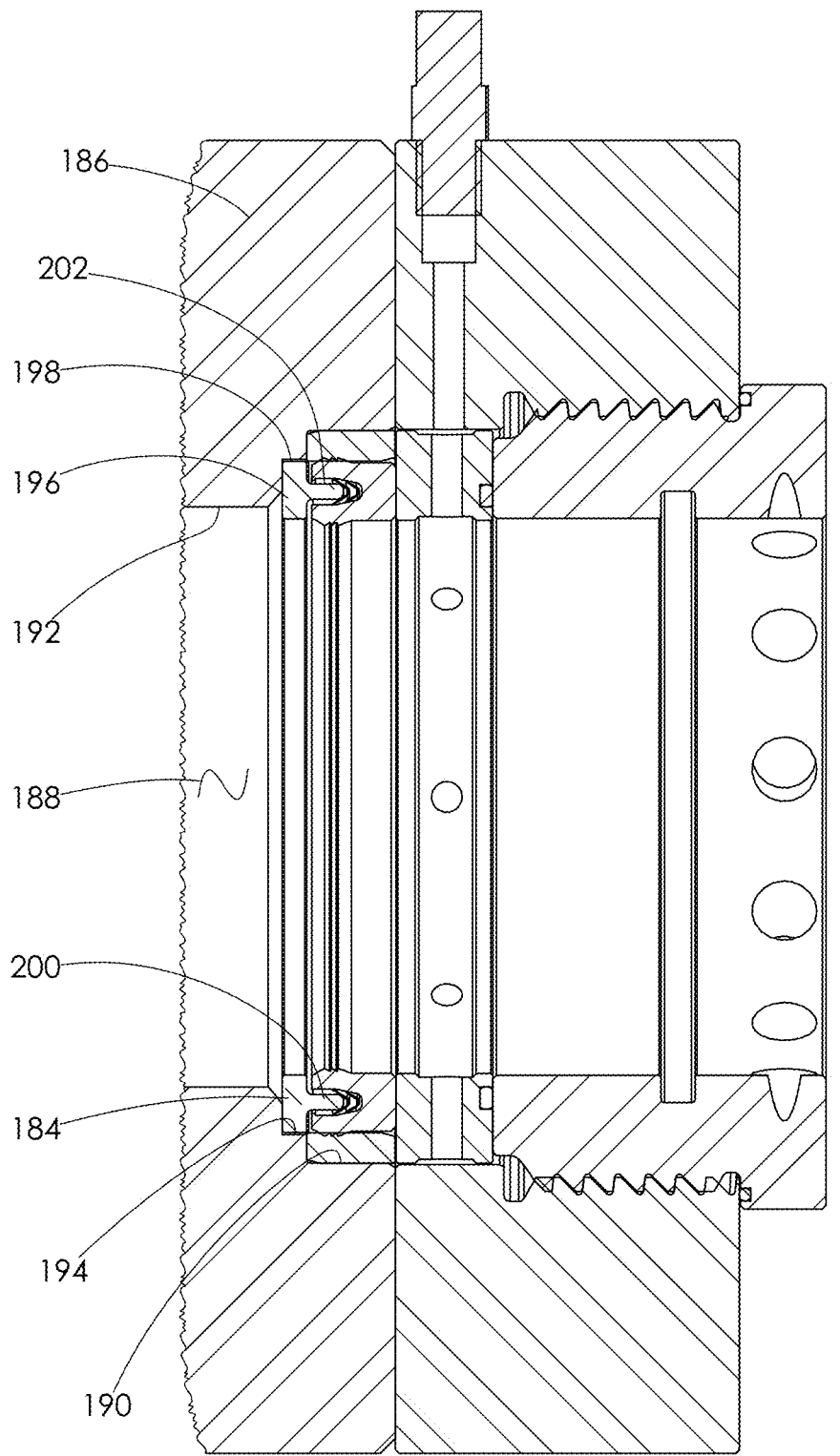
FIG. 33 is a cross-sectional and enlarged view of another embodiment of a packing seal assembly.

Turning to FIG. 33, another embodiment of a support element 184 and housing 186 are shown. The housing 186 is identical to the housing 20A, but it does not include the tapered surface 104, shown in FIG. 4. Instead, the walls surrounding a horizontal bore 188 of the housing 186 comprise a first counterbore 190 joined to a uniform diameter section 192 by a second counterbore 194. The support element 184 is identical to the support element 86, but a base 196 of the element 184 has a rectangular shaped outer surface 198 configured to be installed within the second counterbore 194 formed in the housing 186. Additionally, a protrusion 200 projecting from the base 196 of the support element 184 has a generally rectangular or uniform diameter outer surface 202, instead of the tapered outer surface 100, shown in FIG. 14. The support element 184 functions in the same manner as the support element 86.

The packing seal assembly 60 disclosed herein may be used with other embodiments of fluid end sections not specifically disclosed herein. For example, the packing seal assembly 60 may be used with the fluid end sections disclosed in U.S. patent application Ser. No. 17/884,712, previously incorporated herein by reference, and U.S. patent application Ser. No. 17/550,552, authored by Thomas et al., the entire contents of which are incorporated herein by reference. Alternatively, the packing seal assembly 60 may be used with traditional block fluid ends known in the art, such as those disclosed in U.S. Pat. No. 10,941,765, issued to Nowell et al., the entire contents of which are incorporated herein by reference. In further embodiments, the packing seal assembly 60 may be used with other embodiments of retaining systems, such as those disclosed in U.S. patent Ser. No. 17/685,936, authored by Foster et al., the entire contents of which are incorporated herein by reference.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A packing seal assembly configured to surround at least a portion of a reciprocating plunger, the packing seal assembly comprising:
a packing seal, comprising:
a body, comprising:
a front surface;
an opposed rear surface; and
an inner intermediate surface joining the front and rear surfaces, the inner intermediate surface configured to engage the portion of the reciprocating plunger;
in which the rear surface of the body is configured to engage an annular ring, the annular ring comprising a plurality of passages that are configured to receive a lubricant; and an energizing component situated within a void formed in the front surface of the body; and
a support element, comprising:
a protrusion situated at least partially within the void; and
an annular base situated outside of the void;
in which the support element is configured to retain the energizing component within the void.

2. The packing seal assembly of claim 1, in which the packing seal is one and only one seal.

3. The packing seal assembly of claim 1, in which the body is formed from an elastomeric material.

4. The packing seal assembly of claim 1, in which the energizing component comprises a plurality of stacked pieces.

5. The packing seal assembly of claim 4, in which each of the plurality of stacked pieces has a V-shaped cross section.

6. The packing seal assembly of claim 4, in which each of the plurality of stacked pieces is metal.

7. The packing seal assembly of claim 1, in which the annular base comprises opposed front and rear base surfaces; in which the rear base surface abuts the front surface of the body.

8. The packing seal assembly of claim 7, in which the protrusion extrudes from the rear base surface.

9. A packing seal assembly for use within a fluid end, the packing seal assembly comprising:
one and only one packing seal, comprising:
a front surface defining an opening;
a rear surface opposed to the front surface;
an inner intermediate surface interconnecting the front and rear surfaces, the inner intermediate surface comprising a plurality of inner lips; and
an outer intermediate surface interconnecting the front and rear surfaces, the outer intermediate surface comprising a plurality of outer lips;
in which the rear surface is configured to engage an annular ring, the annular ring having a plurality of passages formed therein, each of the plurality of passages configured to receive a lubricant.

10. The packing seal assembly of claim 9, in which the inner intermediate surface is configured to engage at least a portion of a reciprocating plunger.

11. The packing seal assembly of claim 9, in which the outer intermediate surface is configured to engage a wear ring installed within of a fluid end housing.

12. The packing seal assembly of claim 9, further comprising:
an energizing component comprising a plurality of stacked pieces situated within the opening.

13. The packing seal assembly of claim 12, in which each stacked piece has a V-shaped cross-section.

14. The packing seal assembly of claim 9, further comprising:
a support element, comprising:
a base having a first surface configured to engage a wall formed in a fluid end housing; and
a protrusion, at least part of the protrusion situated in the opening.

15. A fluid end, comprising:
a fluid end housing comprising a bore;
wear ring installed within the bore; and
the packing seal assembly of claim 9 situated inside the wear ring.

16. The fluid end of claim 15, further comprising:
a packing nut comprising front and rear surfaces, the front surface configured to engage the annular ring.

17. The fluid end of claim 16, in which the wear ring is formed of a different material than a material used to form the fluid end housing.

18. A fluid end, comprising:

a fluid end housing having a bore formed therein, the bore comprising a counterbore; and the packing seal assembly of claim 9, further comprising:

a support element situated at least partially within the counterbore, the support element comprising a protrusion extending at least partially into the opening.

19. The fluid end of claim 18, further comprising a wear ring situated within the bore, the wear ring surrounding at least a portion of the packing seal assembly.

20. The fluid end of claim 19, in which the wear ring is made of a first material and the housing is made of a second material; in which the first material is different than the second material.

\* \* \* \* \*